United States Patent Office 3,541,529
Patented Nov. 17, 1970

3,541,529
REPLACEMENT SYSTEM
Robert A. Nelson, Yorktown Heights, N.Y., assignor to International Business Machines Corporation, Armonk, N.Y., a corporation of New York
Continuation-in-part of application Ser. No. 513,479, Dec. 13, 1965. This application Sept. 22, 1969, Ser. No. 859,784
Int. Cl. G11c 9/00
U.S. Cl. 340—172.5         9 Claims

ABSTRACT OF THE DISCLOSURE

A replacement system for data processing apparatus wherein there is utilized a large-capacity, low-speed, back-up store, a high-speed low-capacity working memory, and an associative memory. The replacement system effects the replacement of blocks in the low-capacity working memory with blocks from the back-up store. In the implementation of the system, blocks in the working memory are marked as they are utilized and only unmarked blocks are selected for replacement by blocks in the back-up store. In the situation where all of the blocks in the working memory momentarily become marked, all of them thereupon are caused to become unmarked. An additional replaceability criterion, such as the fact that a block is altered or unaltered when utilized, also is considered by the system when making replacement decisions.

RELATED APPLICATION

The present application is a continuation-in-part of an application filed by the same applicant on Dec. 13, 1965, Ser. No. 513,479 now abandoned.

BACKGROUND OF THE INVENTION

This invention relates to a replacement system and more particularly, to a system which selects the location in a high-speed, low-capacity storage device at which a block of information from a low-speed, large-capacity back-up storage device is to be stored.

When a situation exists where there is a set having a fixed number of members, a problem arises as to which member to replace when the set is full and it is desired to add a new member. This invention provides a general solution to the replacement problem when the members of the set are being utilized in a random manner, and applies the solution to a specific problem arising with respect to the memory system of a large computer.

In an electronic computer, it is highly desirable to store all information in such a manner that it be immediately available for control and processing. To achieve the fastest processing, the best storage apparatus would be one having a capacity at least as large as the largest possible problem requires and the highest possible speed. However, since the price of storage is roughly proportional to the product of (speed) × (capacity), the price of a large-capacity, high-speed memory becomes prohibitive. Therefore, existing high-speed memories have a relatively small capacity which is often exceeded by the amount of information required for large problems or multiprogramming.

One solution to the problem of providing sufficient high-speed memory for large problems or multiprogramming is the one-level-store machine. In such a machine a large-capacity, low-speed store is provided which has sufficient capacity to store all the information required for any desired problem. A low-capacity, high-speed store is also provided and programs are written as if all the information were in this high-speed store. A third memory is also provided which indicates which information from the low-speed store is also contained in the high-speed store at any given time. When the program running on the computer requires a particular word of information, a check is made to see if this word is in the high speed store. If it is in the high speed store, the information is retrieved and used. If the word is not in the high-speed store, a search operation is performed with the required word being transferred from the low-speed, back-up store to the high-speed store. While it is possible that this exchange could be made on a single word basis as the necessity arises, it has been found that, due to the slow speed of the back-up store, the time delay involved in making the transfer is frequently almost independent of whether a single word or a block of words is transferred. Experience has shown that the probability is high that if a word is required, others in its locality will also be needed soon. Therefore, when a determination is made that a word of information is required from back-up store, a transfer of the block containing this word is made from back-up store to high-speed store.

As long as there are empty blocks of addresses in high-speed store, the above described transfer operation presents no problem. However, when the high-speed store is full, a replacement problem arises. When replacement of an information block is required, an ideal replacement criterion would always cause the block of information which is not going to be used again for the longest period of time to be replaced. Existing criteria, which have either selected the block to be replaced randomly or have made the selection on a first-in-first-out (FIFO) basis (i.e., have replaced the block which has been in high speed store for the longest time), have fallen far short of this ideal.

SUMMARY OF THE INVENTION

It is a primary object of this invention to provide an improved system for determining the member of a fixed-length set which is to be replaced when a new member is to be applied to the set and the set is full.

A more specific object of this invention is to provide an improved system for determining the block of information in a high-speed, low-capacity storage device which is to be replaced when a new block of information is being brought in from the back-up store and the high-speed storage device is full.

Another object of this invention is to provide a replacement system of the type described above which more nearly approaches the optimum situation where the block which is replaced is the one which will not be utilized again for the longest period of time.

In accordance with the objects, this invention provides a replacement system which takes into account the relative utilization of the members of the fixed-length set. In the ideal situation this would involve dynamically ordering the blocks of information (i.e., members of the set) according to the sequence of references to them, and, when the necessity arises to replace a block, replacing the block to which reference has not been made for the longest period of time. Using these criteria, it is hoped that the history of recent past can be carried over as an indication of the near future. While dynamic reordering may give good results on a relocation problem, this is a costly procedure and it has been found that very good results can be obtained by merely dividing the blocks into two subsets; one to which recent references have been made and the other to which recent references have not been made. Using the past future carry-over assumption, replacement is made of a block in the second subset. In a preferred embodiment of the invention, this concept is implemented by marking each block as it is utilized and selecting for replacement only unmarked blocks. When the set of unmarked blocks vanishes, a mechanism is provided for unmarking all of the blocks, or all but the last block, and then proceeding as before.

Since, on the average, there is more than one element in the unmarked set, an additional criterion is required to pick from the unmarked set. The additional criterion may be a random choice, may be a sequential choice, or may be based on a combination of one of these criteria and a determination as to whether the block has been altered during the time that it has resided in high speed memory. Since, if the block has been altered, it must be rewritten into low-speed memory before the block may be replaced, it is faster, and therefore preferable, to select for replacement, where possible, a block which has not been altered.

It is therefore a feature of this invention to utilize the past-future carry-over assumption in making a choice as to which member of a set of fixed length is to be replaced when a new member is to be added to the set and the set is full.

Another feature of this invention is to apply the past-future carry-over assumption to the solution of the replacement problem in a one-level-store machine.

Still another feature of this invention is to supplement the above solution to the replacement problem with at least one additional criterion where the past-future carry-over criteria does not yield a single solution.

A further feature of this invention is to provide, as an additional criterion in a replacement situation, information as to whether a block in high-speed store has been altered during the period that it has resided therein.

The foregoing and other objects, features and advantages of the invention will be apparent from the following more particular description of a preferred embodiment of the invention as illustrated in the accompanying drawings.

DESCRIPTION OF THE DRAWINGS

FIG. 2 is a diagram illustrating how FIGS. 2A–2E are combined to form a schematic block diagram of a preferred embodiment of the invention.

FIGS. 2A–2E when combined, form a schematic block diagram of a preferred embodiment of the invention.

FIG. 3 is a diagram illustrating how FIGS. 3A–3D are combined to form a schematic block diagram of the associative memory and related registers and controls shown in FIGS. 2D and 2E.

DETAILED DESCRIPTION OF PREFERRED EMBODIMENT

Figures 2, 2A:
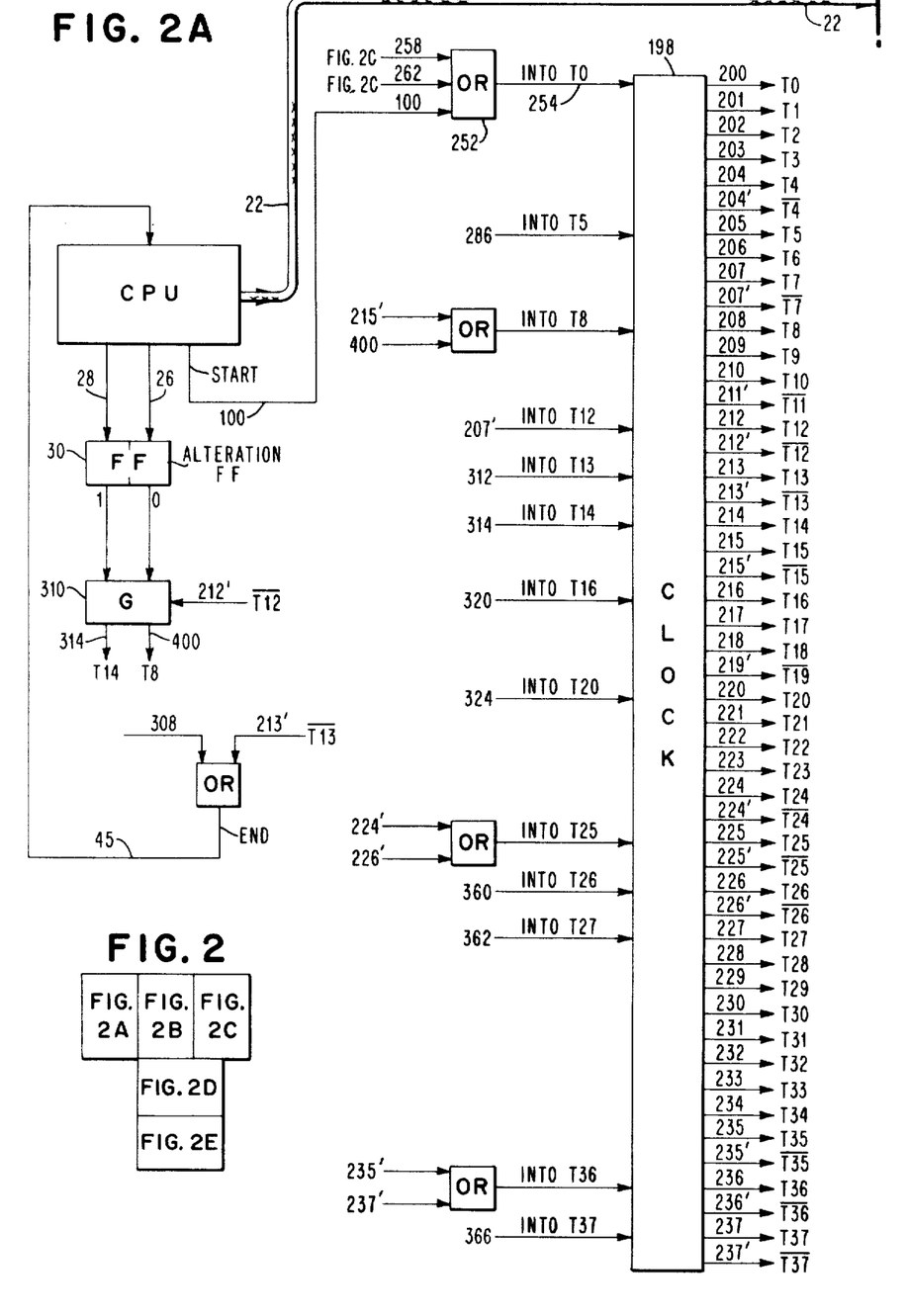
Figure 2B:
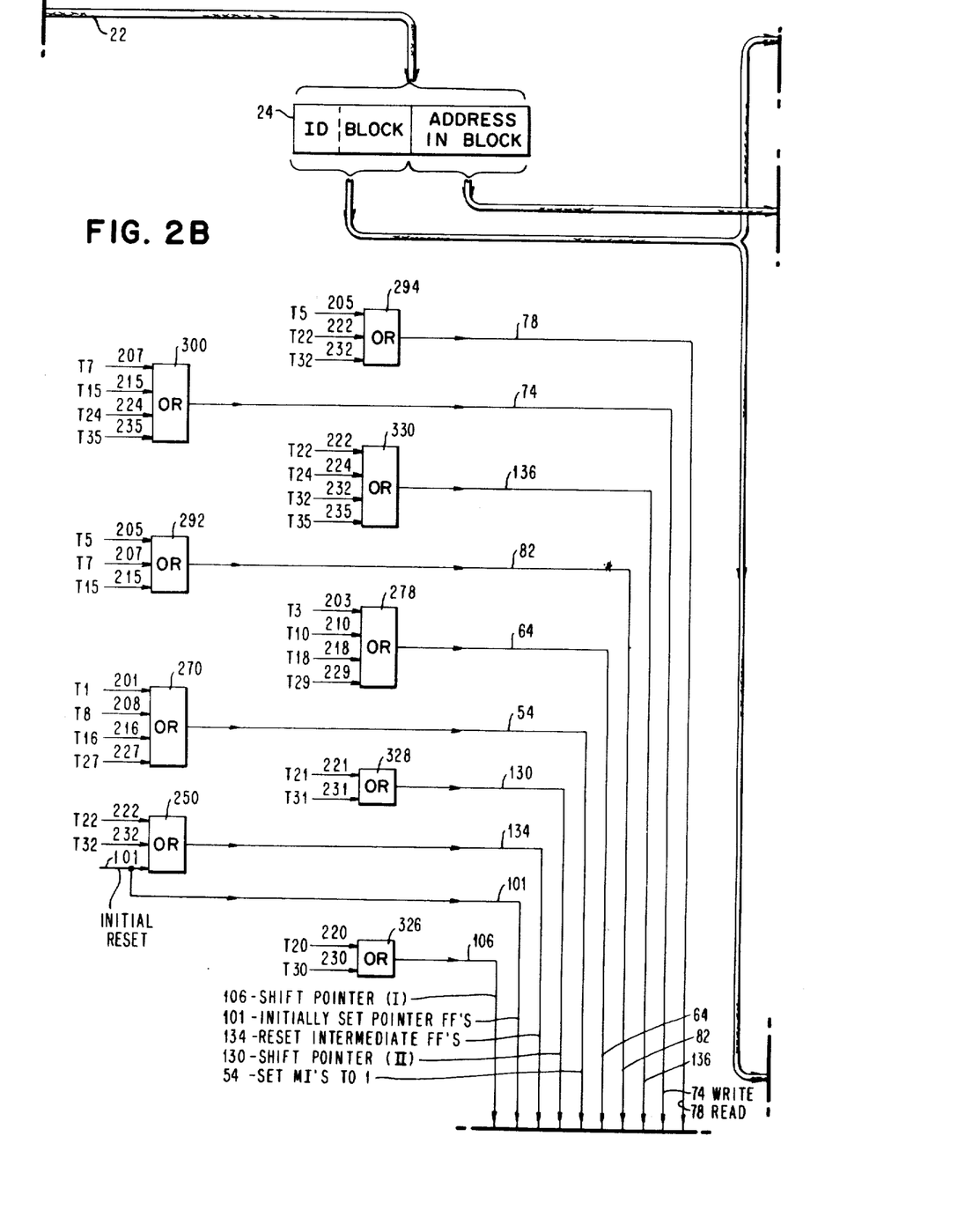
Figure 2C:
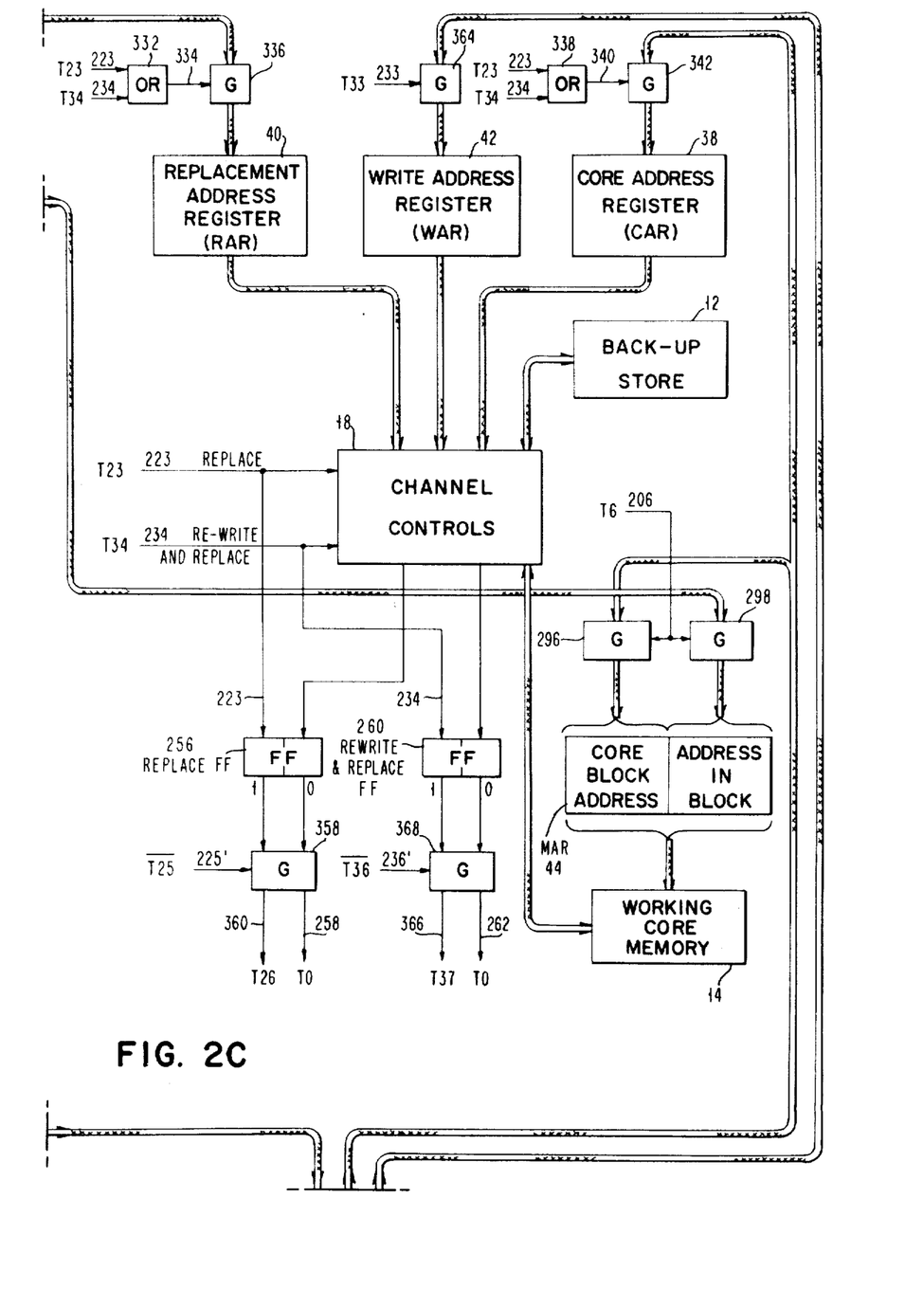
Figure 2D:
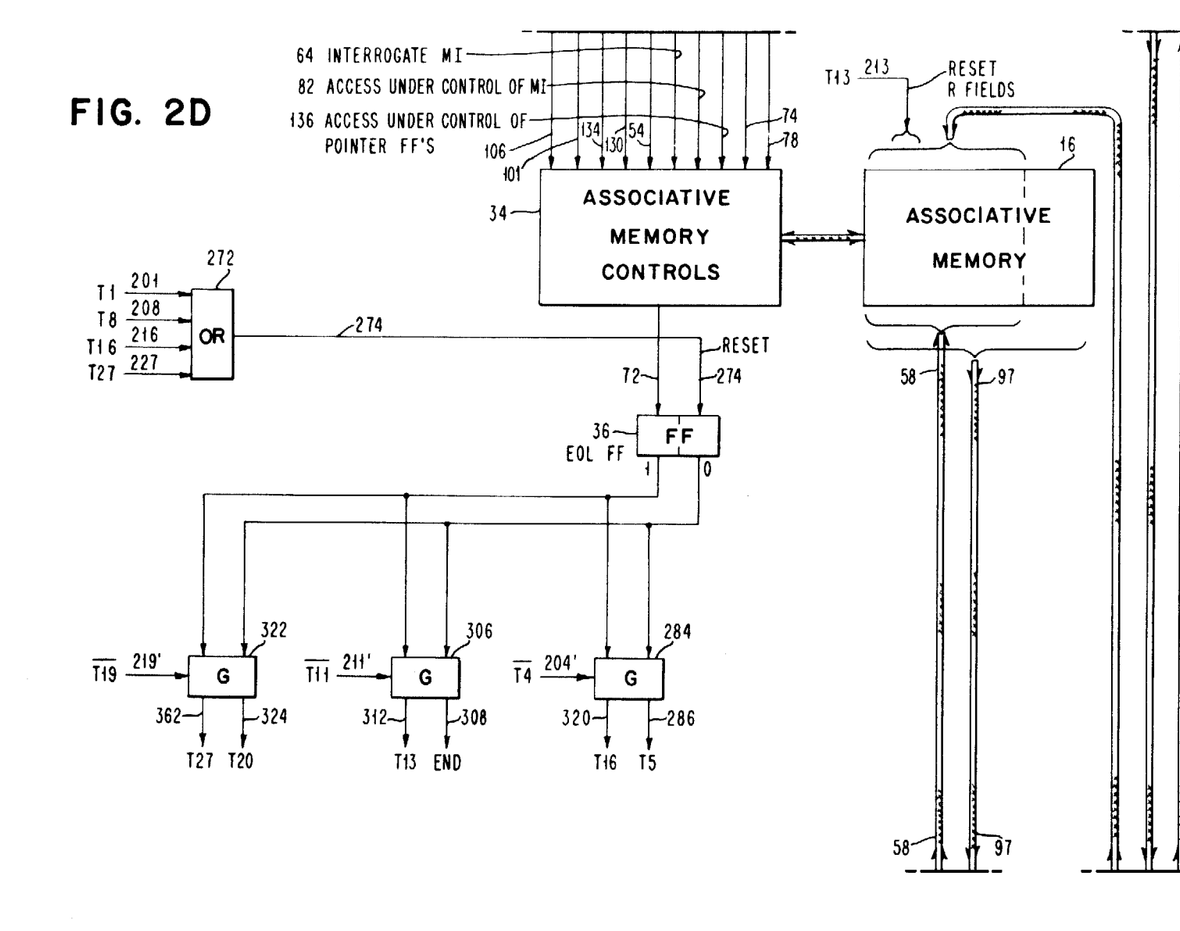

Referring now to FIGS. 2A–2E, it is seen that the system of the preferred embodiment of the invention includes as basic elements a central processing unit (CPU) 10 (FIG. 2A), a large-capacity, low-speed, back-up store 12 (FIG. 2C), a high-speed, low-capacity, working core memory 14, and an associative memory 16 (FIG. 2D). Back-up store 12, which may, for example be an IBM 1301 disc file, is connected to core memory 14, which could be the high-speed magnetic core memory which is associated with any digital computer system, through channel 18. Channel 18, which includes a variety of controls, could, for example, be the channel of the IBM 7040 computer system, where this is the CPU being used, or any of a variety of other channel devices which are capable of performing the required buffering and control functions. The channel accepts the serially applied information from the low-speed memory 12, assembles the bits into words, and applies these words in parallel to core memory 14. The channel is also capable of accepting words in parallel from core memory 14 and of applying the bits thereof serially to back-up store 12. The channel also contains control circuitry for suitably incrementing the addresses from which information is being taken or to which information is being applied and for indicating when the transfer of a block of information has been completed.

Figure 2E:
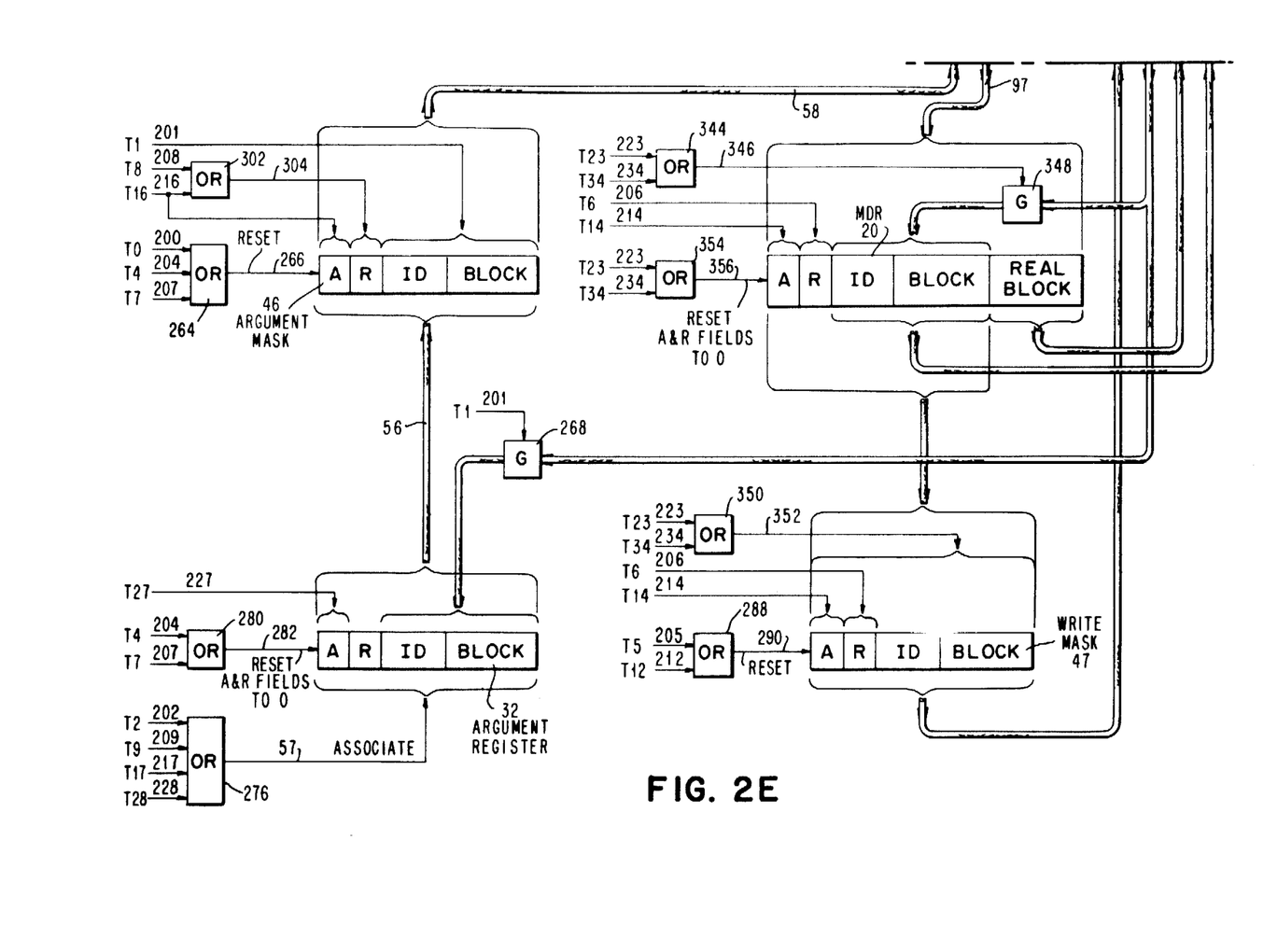

Associative memory 16 has an entry for each of the block positions in core memory 14. Each of these entries contains five fields which are illustrated in memory data register (MDR) 20 (FIG. 2E). Reading from left to right these fields are: a one bit A field (alteration field) which is set when the corresponding block in core memory 14 has its contents altered; a one bit R (reference) field which is set each time the corresponding block in core memory 14 is utilized and is reset when all of the entries in the associative memory 16 have their R fields set; an ID field which identifies the program in CPU 10 which the block in the associated position in core memory 14 is associated with; the block address in back-up store 12 for the block in the corresponding block position in core memory 14; and the block address in core memory 14 which the entry corresponds to. The right-most field of each entry in associative memory 16 may be read only. The other fields in associative memory 16 are altered from time to time in a manner to be described later.

GENERAL DESCRIPTION OF OPERATION

Figure 1:
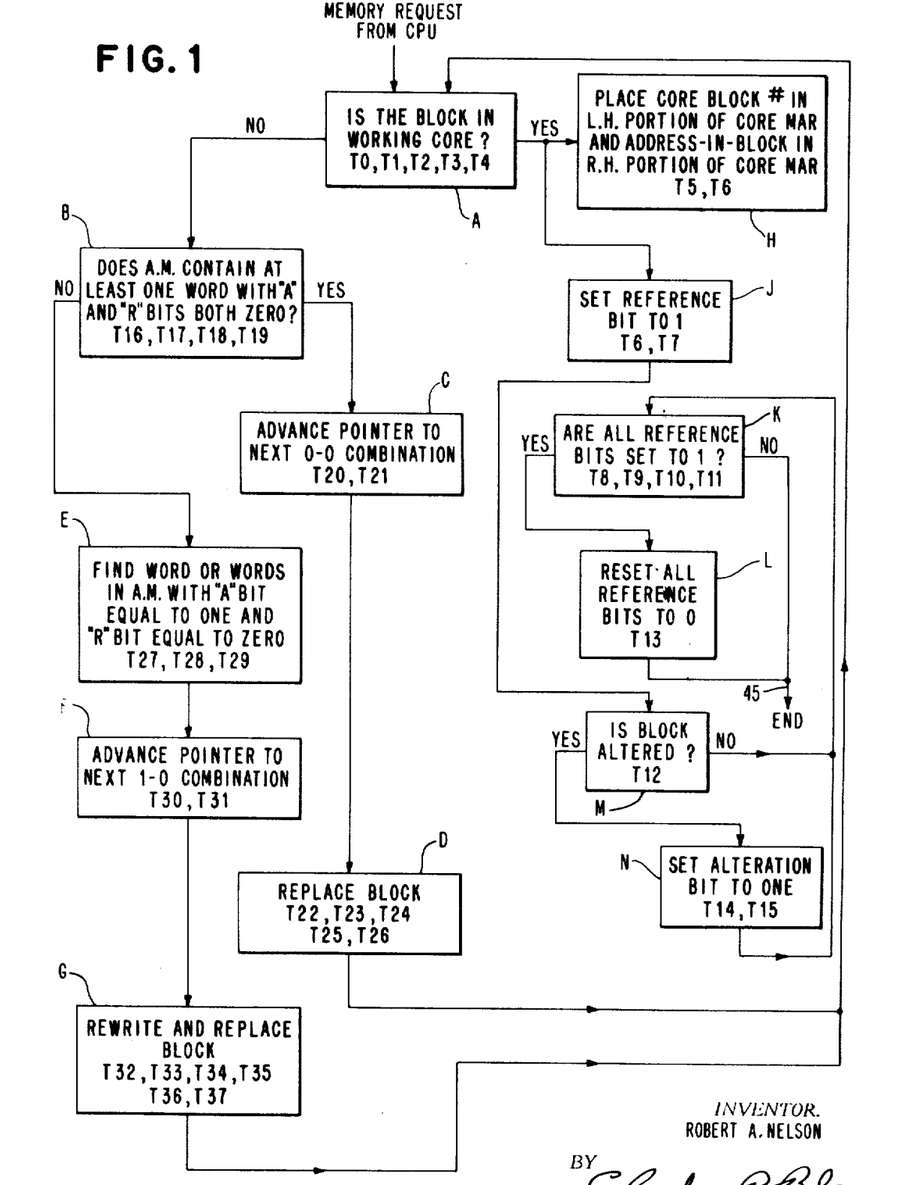
FIG. 1 is a flow diagram of the operation of a preferred embodiment of the replacement system of this invention.

The flow diagram of FIG. 1 will now be used to describe in a general way how the circuit of FIGS. 2A–2E operates to perform the desired one-level store function. When CPU 10 (FIG. 2A) starts the operation by requesting an information word from memory, the program ID and the address of the required work in back-up store 12 are applied through lines 22 to address register 24 (FIG. 2B) and a signal is applied through either line 26 or line 28 to suitably set alteration flip-flop 30. Flip-flop 30 is set to its 1 state if the word sought is to be altered.

After the preliminary loading operations have been completed, the system is ready to perform step A of FIG. 1. During this step a determination is made as to whether the block containing the word which it is desired to utilize is stored in core memory 14 (FIG. 2C). This step is accomplished by reading the ID and block information from register 24 (FIG. 2B) into the appropriate fields of argument register 32 (FIG. 2E) of associative memory 16 and performing an associate operation on these fields to determine if this ID and block are contained in the associative memory. To briefly describe an associate operation, associative memory controls 34 contain a bistable match indicator for each entry in the memory. The match indicators are all set to 1 prior to an associate operation. The fields in argument register 32 which being matched on are then applied to associative memory 16 and compared against the corresponding fields in each entry therein. Each mismatch causes the corresponding match indicator in controls 34 to be reset. The match indicators are then interrogated and end-of-line (EOL) flop-flop 36 set if all the match indicators are reset. If no match is found in the associative memory 16 on the indicated ID and block information, this indicates that the required block is not in core memory 14 and the circuit proceeds to perform step B of FIG. 1. The steps which are performed if the required block is in core memory 14 will be described later.

During step B of the operation, a determination is made as to whether there are any entries in associative memory 16 (FIG. 2D) for which the bits in both the A and the R fields are 0. The R bit of such an entry being 0 indicates that this entry has not recently been utilized. The A bit of the entry being 0 indicates that the entry has not been altered during its residence in core memory. From previous discussion, it is apparent that a block for which these characteristics exist is a prime candidate for replacement. Step B is performed by setting both the A and R fields in argument register 32 (FIG. 2E) to 0 and performing an associative operation in associative memory 16 on these fields. The result of the associate operation will be to leave the match indicator in associative memory controls 34 corresponding to each entry in the associative memory having both "0"A and a "0"R field in their 1 state. If there are no entries with "0"A and "0"R fields, end-of-line flip-flop 36 is set to its 1 state at the end of the associate operation.

Assume initially that there is at least one entry in associative memory 16 for which both the A and R bits are 0. Under these conditions, the system proceeds from step B (FIG. 1) to step C. Since it is possible that there will be more than one entry in the associative memory having 0 bits in both their A and R fields, it is necessary to provide an additional criterion to select, from among these entries, the entry whose corresponding block is to be replaced. This selection is performed during step C of the operation. To describe this operation briefly, there is a pointer flip-flop in associative memory controls 34 for each entry in associative memory 16. All of the pointer flip-flops are reset except the one corresponding to the last block that was replaced in core memory 14. During step C of the operation, a search is started, beginning with the entry following that for which the pointer flip-flop is set, to find an entry for which the match indicator in controls 34 is set. When the entry is found, the pointer flip-flop for this entry is set and the pointer flip-flop which was set is reset. The pointer may be advanced from, or through, the lowermost word position to, or through, the uppermost word position, and under some conditions it may even be recycled back to its starting word position.

From step C of the operation, the circuit proceeds to step D to cause the block in core memory 14 corresponding to the entry selected in associative memory 16 during step C to be replaced. This is accomplished by reading the core block address of the selected entry into core address registers (CAR) 38 (FIG. 2C), by reading the ID and block information for the new block which is to be applied to core memory 14 from register 24 (FIG. 2B) into replacement address register (RAR) 40, and by applying a replace input to channel 18. The effect of these inputs on channel 18 is to cause the channel to read the block of information starting at the address indicated in RAR 40 into core memory 14 at addresses beginning at the address indicated in CAR 38. When a complete block of information has been transferred, this fact is indicated in a manner to be described later by channel 18. When step D of the operation has been completed, the system returns to step A.

Assume now that during step B of the operation, a determination was made that there are no entries in associative memory 16 for which both the A and R bits are 0. Under these conditions, the system proceeds from step B to step E. In the algorithm on which the system is based, utilization is the prime replacement criterion and alteration only an additional criterion. Therefore, if no entry can be found for which both the A and R bits are 0, an entry is selected for which the A bit is 1 and the R bit 0. Since as will be seen later, when all of the R bits are 1, the R-bit-fields for all the entries in associative memory 16 are reset, there will always be at least one entry having an "0"R bit. Step E of the operation is accomplished substantially in the same manner as step B with the exception that arbument register 32 is initially loaded with a 1 bit in the A field and a 0 bit in the R field. An associate operation is then per formed, with the match indicators in controls 34 for entries having a 1 bit in the A field and a 0 bit in the R field being left in their 1 state.

From step E, the system proceeds to step F (FIG. 1) of the operation. Since it is possible that more than one match indicator will be set during step E of the operation, step F is required in order to make a final determination as to which block in core memory 14 is to be replaced. The pointer flip-flops in control 34 are utilized to perform step F of the operation in a manner identical to that previously described for step C of the operation. The operation will therefore not be described again at this point.

From step F, the system proceeds to step G (FIG. 1). Since the block which has now been selected for replacement in core memory 14 has been alterd during its residence therein, it is necessary to rewrite this block into back-up store 12 (FIG. 2C) before replacing it. Therefore, during step G of the operation, a rewrite and a replace operation are performed. In performing step G of the operation, the address of the selected block position in core memory 14 is read into CAR 38, the address in back-up store 12 at which the block of information presently stored in the selected core block is to be rewritten, which address is obtained from associative memory 16, is read into write address register (WAR) 42, the address in back-up store 12 of the new block which is to be read into core memory 14 is read into RAR 40, and a signal is applied to the rewrite and replace input of channel 18. The channel then functions in a standard fashion to rewrite the block of data from the selected block in working core into back-up store 12 at an address beginning with the address in WAR 42 and to then read the block of data starting at the address indicated in RAR 40 into the selected block in core memory 14. When the complete block has been written into core memory 14, the channel 18 generates an output signal indicating the end of step G of the operation and causing the system to return to step A.

Assume now that during step A of the operation a determination is made that the desired block is now stored in core memory 14. This determination may be made either initially when the request for information is made by CPU 10 (FIG. 2A) or may arise as a result of the block of information being read into core memory 14 during step D or G (FIG. 1) of the operation. When the desired block is found in core memory 14 during step A of the operation the system may proceed simultaneously to perform steps H and J of the operation. During step H of the operation, the block address in core memory 14 at which the desired block of information is stored is read into the left-hand portion of core memory address register (MAR) 44 (FIG. 2C) and the address in the block is read from the right-hand portion of register 24 (FIG. 2B) into the right-hand portion of MAR 44. CPU 10 may now retrieve the desired word from core memory 14 and utilize it as required.

When the word associated with a block stored in core memory 14 is utilized, certain housekeeping operations on the A and R fields of the corresponding entry in associative memory 16 (FIG. 2D) are required. These housekeeping operations are performed during steps J–N (FIG. 1) of the operation. During step J of the operation, the reference bit for the entry corresponding to the block whose word was just utilized is set to 1. This is accomplished by setting the R field of the associated memory data register (MDR) 20 (FIG. 2E) to 1 and then writing only this field into the proper entry of the associative memory in a manner to be described later.

From step J, the system proceeds to step M of the operation. During step M of the operation, alteration flip-flop 30, FIG. 2A, is interrogated to determine if the block just utilized was altered. It will be remembered that the alteration flip-flop is set to its 1 state prior to the start of the operation if the block is to be altered. If the block is not altered, the system proceeds to step K of the operation. If the block has been altered, the system proceeds to step N of the operation. During step N the alteration bit for the entry is associative memory 16 corresponding to the block just utilized in core memory 14 and has its aleration bit (i.e., A field) set to 1. This is accomplished by setting a 1 bit into the A field of MDR 20 (FIG. 2E) and writing this field, in a manner to be described later, into the selected entry in the associative memory 16.

From step N the system proceeds to step K. During step K of the operation, a determination is made as to whether all of the reference bits are set to 1. This is accomplished by setting the R field of argument register 32 (FIG. 2E) to 0 and associating on this field in associative memory 16. If no matches are found during this associative operation, it means that all of the R bits are set to 1. From previous discussion, it will be remembered that, if all the R bits are set to 1, the R bits are to be reset. Therefore, when this occurs, the system proceeds from step K to L of the operation. During step L of the operation, a signal is applied to associative memory 16 to reset the R fields of all of the entries therein to 0. When step L has been completed, a signal is applied through line 45 to CPU 10 to indicate that the operation has been completed. The above is also true if, during step K, a determination is made that all the reference bits are not set to 1.

OPERATION OF ASSOCIATIVE MEMORY

In order to fully understand the operation of the system shown in FIGS. 2A–2E, it is necessary to have a better understanding of the operation of associative memory 16 (FIG. 2D) and controls 34. FIGS. 3A–3D illustrate associative memory 16, argument register 32, associative memory controls 34, and argument mask 46, all of which are shown more generally in FIGS. 2D and 2E. Associative memory 16, MDR 20 (shown only in FIG. 2E), write mask 47 (shown only in FIG. 2E), argument register 32, and argument mask 46 are of a type shown in United States Letters Pat. No. 3,317,898, issued on May 2, 1967 to H. Hellerman and assigned to the assignee of the instant application. The operations of these elements will be described hereinafter, and a still more detailed understanding of them may be obtained from the above mentioned patent. Controls 34 are to some extent the same as those shown in the Hellerman patent, differing primarily in the presence of the pointer flip-flops and in the controls associated with these flip-flops. A detailed description of the operation of controls 34 follows.

A number of operations may be performed on the associative memory 16. The first operation to be described is an associate operation to determine which entries in associative memory 16 have a field (or fields) that match a particular field (or fields) in argument register 32. This is accomplished by applying the desired bit combination through appropriate ones of the control lines 48 and 49 to the bistable elements 50 (FIG. 3D) of the desired field of argument register 32. A signal on a line 48 sets the corresponding bistable element 50 to its 0 state and a signal on a line 49 sets the corresponding bistable element to its 1 state. The argument register is reset by simultaneously applying signals to all lines 48. When signals are applied to control lines 48 and 49 of the argument register 32, as aforesaid, signals also are applied to the control lines 52 for setting the bistable elements 53 of argument mask 46 which are in the field or fields being matched on. All of the bistable elements 53 have previously been reset by a signal applied simultaneously to all the lines 51. The signals on lines 52 are then effective to set the bistable elements 53 for the desired fields to their 1 state. As a further preliminary operation, a signal is applied through line 54 to set all of the match indicator (MI) flip-flops 55 (FIG. 3B) to their 1 state. When a signal is applied to the associate line 57, FIG. 3D, the contents of the argument bit storing elements 50 are read out through lines 56 to bistable elements 53 which store the bits of the argument mask 46. Those bit storing elements 53 of the argument mask which are set to 1 will pass the information applied thereto through lines 58 to the corresponding bistable bit storing element 60 (FIG. 3C) in each word or row of the associative memory 16. As long as the contents of each word bit element 60 are the same as the contents of the corresponding bistable argument bit element 50, associative memory 16 generates no outputs. However, when the binary signal applied through a line 58 to a word bit element 60 differs from the bit actually stored in element 60, the element 60 generates an output signal on the corresponding mismatch line 62. The signal on line 62 is applied to reset the corresponding match indicator flip-flop 55 to its 0 state.

Readout of a matching word is accomplished as follows:

Match indicators 55 (FIG. 3B) are interrogated by a signal applied to line 64. The signal on line 64 is applied to one input of AND gate 66 for the first word in the associative memory. The other input to this AND gate 66 is the output line 68 from the 0 side of the corresponding match indicator. Output line 70 from each of the AND gates 66 is connected as one input to the AND gate 66 for the next word, with output line 68 from the 0 side of the corresponding match indicator being the other input to each of the AND gates 66. It is therefore seen that if any of the match indicators are in their 1 state, the propagation of the interrogation signal applied to line 64 is blocked, causing the end-of-line flip-flop 36 to remain in its 0 state. As will be seen later, this flip-flop is always reset to its 0 state at the start of an associate operation. If, however, all of the match indicators have been reset to their 0 state, indicating that a matching entry does not exist in associative memory 16, the interrogate signal applied to line 64 propagates through AND gates 66 to appear on no-match line 72. The signal on line 72 is applied to set end-of-line flip-flop 36 to its 1 state.

Information may be either read out or written into a word in associative memory 16 under control of match indicator flip-flops 55. For a write operation a signal is applied through line 74 to one input of each of the AND gates 76 (FIG. 3B), and for a read operation a signal is applied through line 78 to one input of each of the AND gates 80. At the same time that a signal is applied to write line 74 or read line 78, a signal is also applied to an access-under-control-of-match-indicator line 82. The signal on line 82 is applied to one input of AND gates 84. The other input of each of AND gates 84 is an output line 86 from the 1 side of the corresponding match indicator 55. In the operation of the circuit shown in FIGS. 3A–3D, no more than one match indicator flip-flop will be in its 1 state at the end of any associate operation. Therefore, when a signal is applied to line 82 only one of the AND gates 84 will be fully conditioned to pass a signal through output line 88, OR gate 90 and line 92 to the second input terminal of each of the corresponding AND gates 76 and 80. If a write operation is being performed, the corresponding AND gate 76 is conditioned to generate an output signal on line 94, which signal is effective to permit the contents of MDR 20 (FIG. 2E), for those fields which have 1 bits stored in write mask 47, to be written into the bit storing elements 60 of the corresponding word in associative memory 16. Write mask 47 is thus effective to determine which fields of a word in associative memory 16 will be written into during a write operation. If there is a signal on read line 78 at the time a signal appears on line 82, the corresponding AND gate 80 (FIG. 2B) is fully conditioned to generate an output signal on line 96 which is effective to cause the contents of the corresponding word in associative memory 16 to be read out through lines 97 into MDR 20.

The functions of the associative memory described so far are substantially the same as those performed by the associative memory shown in the previously indicated Hellerman Patent 3,317,898. However, the controls 34 shown in FIGS. 3A and 3B also include a pointer flip-flop 98 (FIG. 3A) for each word in the associative memory 16. An initializing signal is applied to line 101 to set the pointer flip-flops to an initial condition wherein the pointer flp-flop for the first word is in its 1 state and the pointer flip-flops for the remaining words are in their 0 state. Specifically, this is accomplished by applying the signal on line 101 through OR gate 102 to the 1 input side of the pointer flip-flop for the first word and through OR gates 104 for each of the remaining words in the associative memory to the 0 input side of the corresponding pointer flip-flop.

When it is desired to change the setting of the pointer flip-flops, a conditioning signal is applied through line 106 to one input of the AND gate 108 (FIG. 3A) for each word in the memory. The other input of each of the AND gates 108 is supplied by the output line 110 from the 1 side of the corresponding pointer flip-flop. Since only one of the pointer flip-flops is in its 1 state at any given time, only one of the AND gates 108 will be fully conditioned by the signal on line 106 to generate an output signal on corresponding output line 112. The signal on an output line 112 from AND gate 108 of a given word position is applied as one input to AND gates 114 and 116 of the next following word position. It is seen that this is a closed loop with the output line 112 from AND gate 108 for word N constituting one input to AND gates 114 and 116 for the first or topmost word. The other inputs to AND gates 114 and 116, respectively, are output line 68 from the 0 side and output line 86 from the 1 side of the corresponding match indicator 55. Output line 118 from AND gate 114 is connected as one input to AND gate 120, the other input to this AND gate being output line 122 from the 0 side of the corre sponding pointer flip-flop 98. AND gate 120 shares output line 112 with AND gate 108 for each word position. Output line 124 from each of the AND gates 116 is connected to the 1 input side of corresponding intermediate flip-flop 126.

Figure 3:
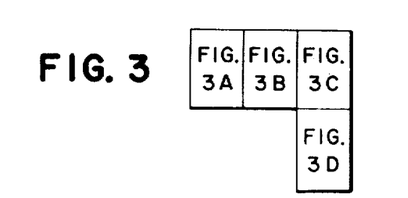
Figure 3A:
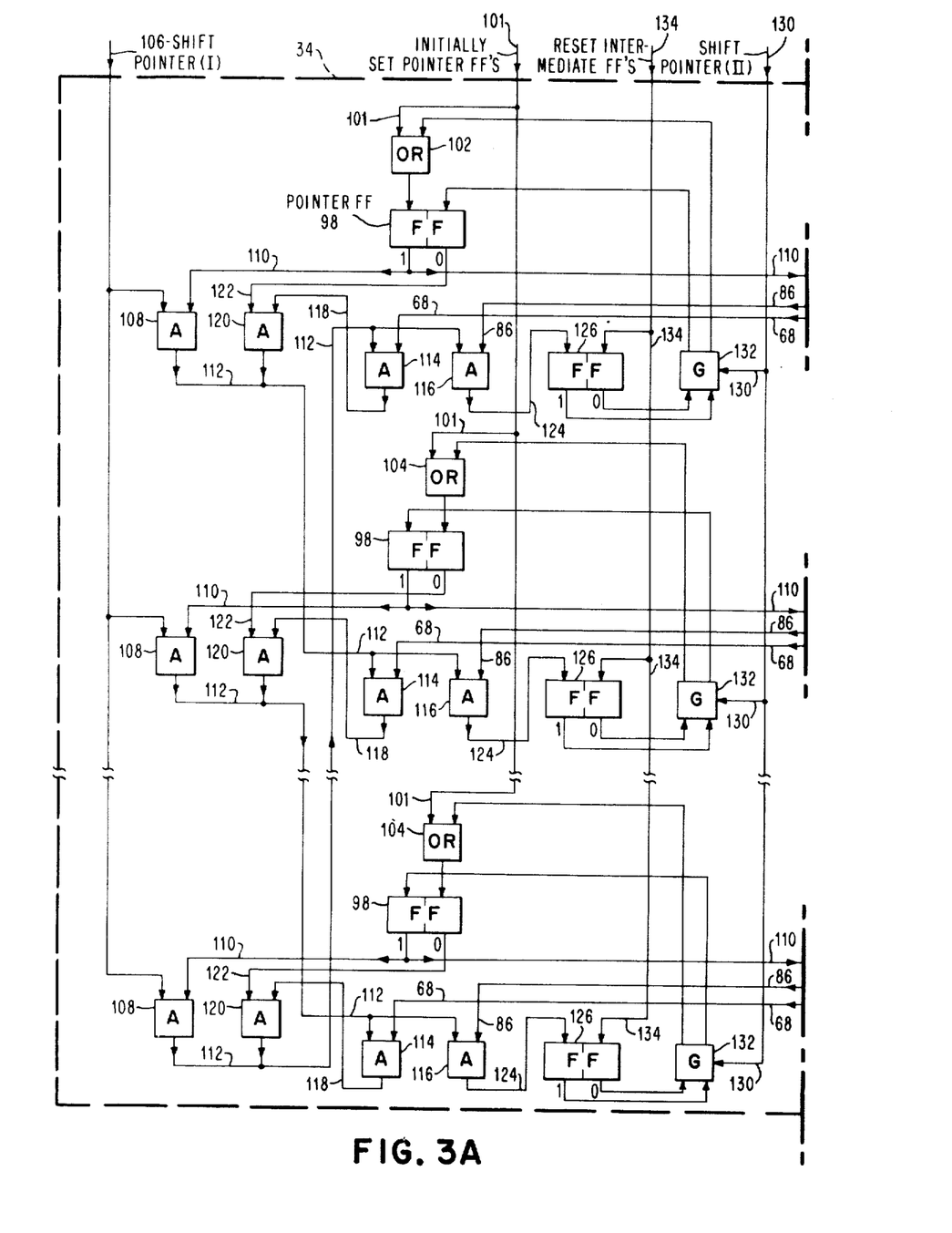
FIGS. 3A–3D when combined, form a schematic block diagram of the associative memory and related registers and controls shown in FIGS. 2D and 2E.
Figure 3B:
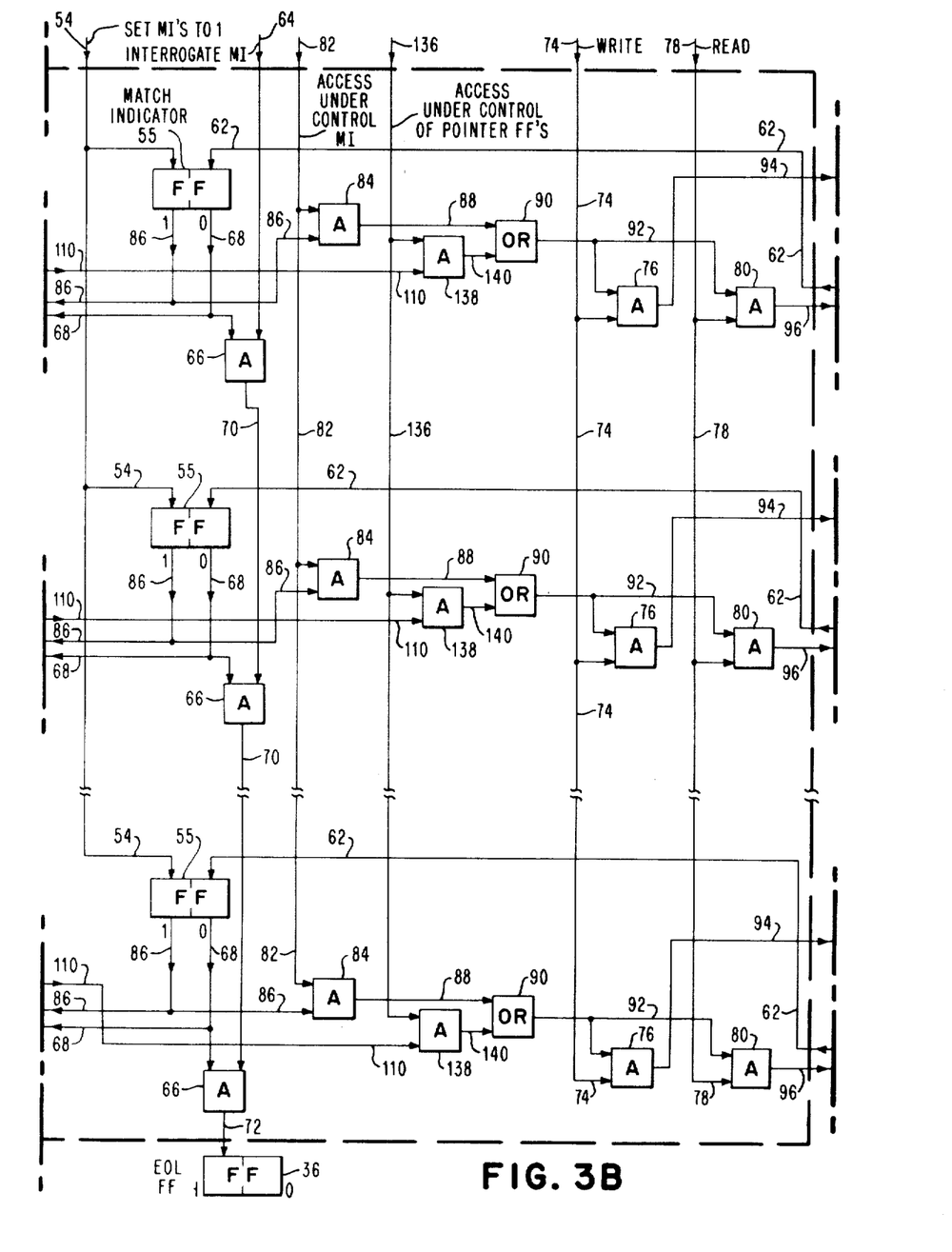
Figure 3C:
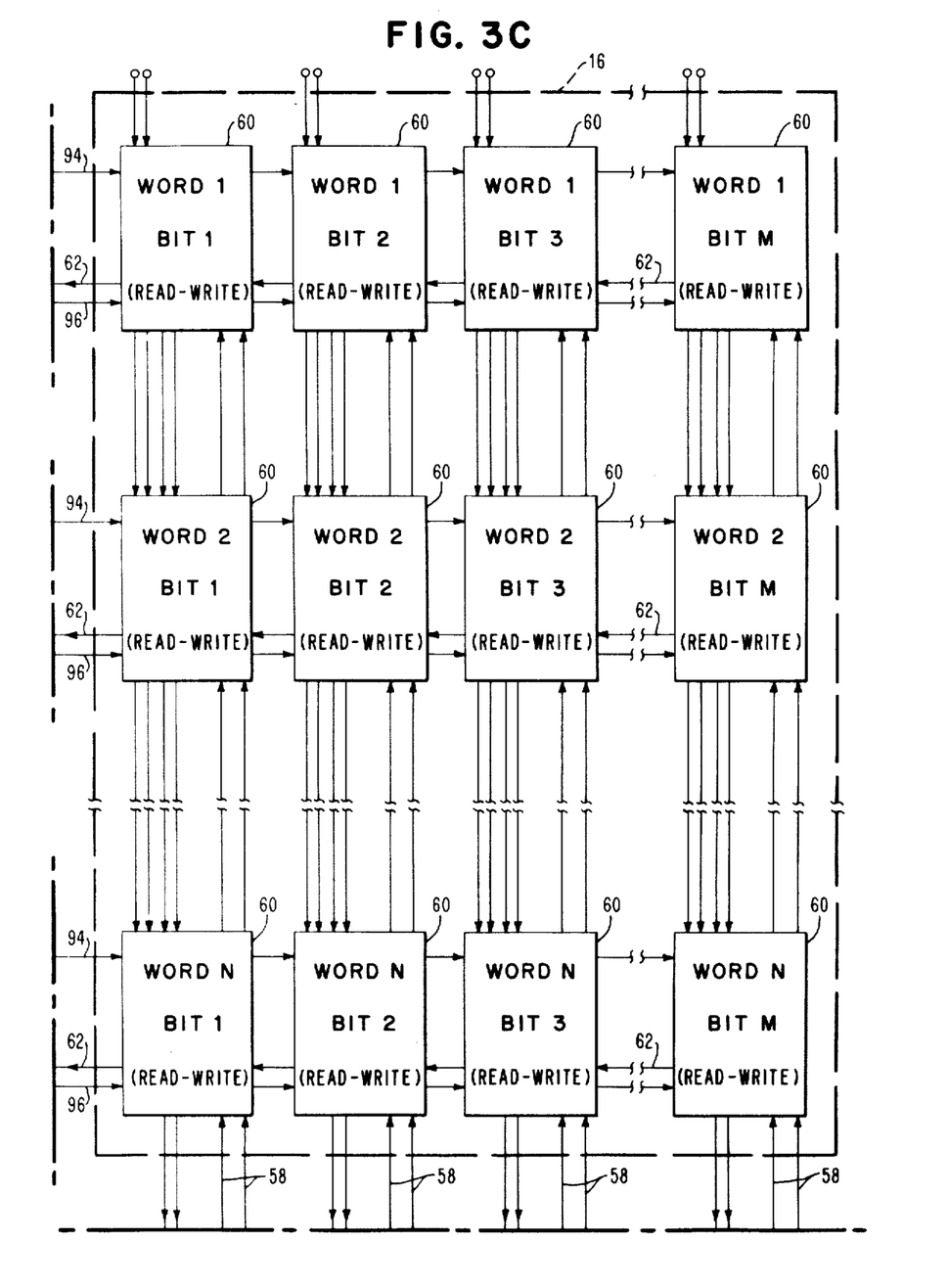
Figure 3D:
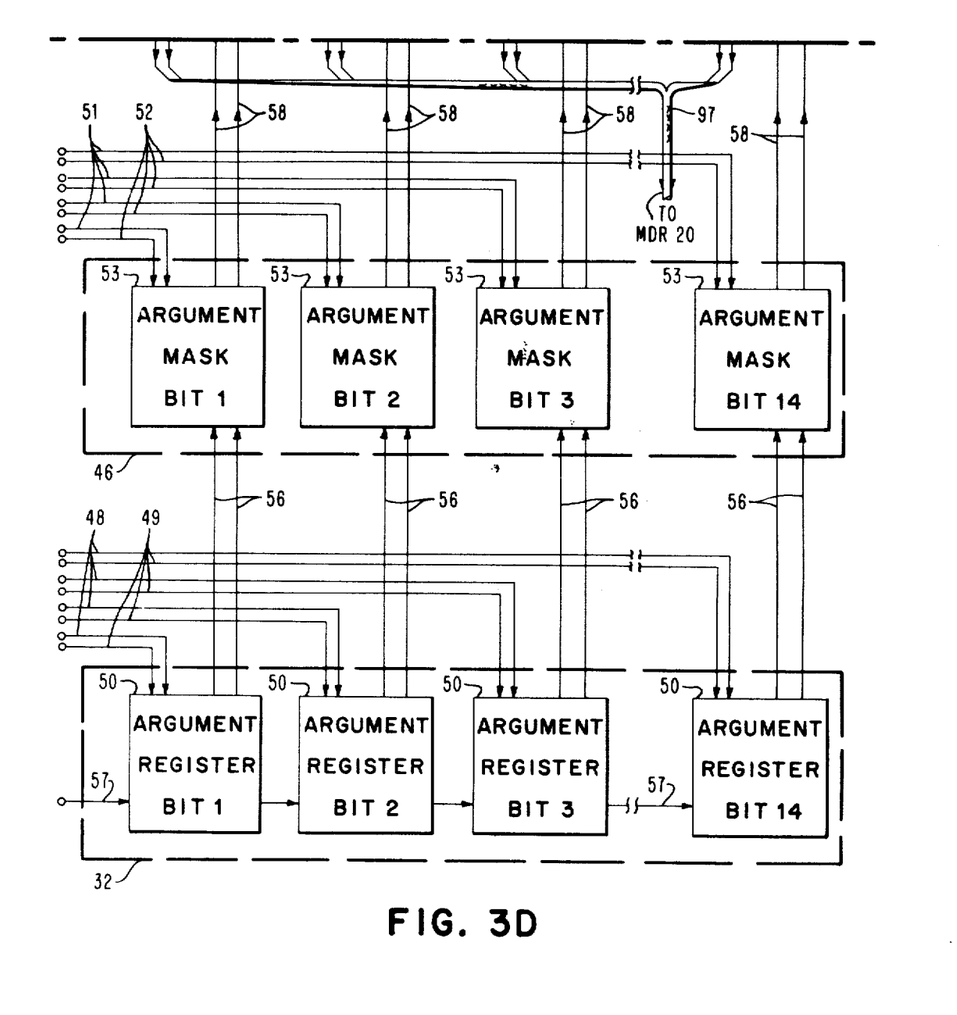

The effect of the connections just described is to permit a signal applied to line 106 to pass through the AND gate 108 for the position having its pointer flip-flop 98 in its 1 state to the corresponding line 112. The signal on line 112 is applied to AND gates 114 and 116 for the following word position. If the match indicator for that word position is in its 0 state, the signal propagates through AND gate 114, line 118, AND gate 120 and line 112 for that word to AND gates 114 and 116 for the next following word. The signal propagates in this manner until a word is reached for which the corresponding match indicator is in its 1 state. When this word is reached, the corresponding AND gate 116 is fully conditioned to generate an output signal which is applied to set the corresponding intermediate flip-flop 126 to its 1 state. If the pointer shift signal is applied to line 106 at a time when the lowermost pointer flip-flop 98, FIG. 3A, is set to 1, or if this shift signal is propagated to the lowermost gate 114 at a time when both the lowermost pointer flip-flop 98 and the lowermost match indicator 55 (FIG. 3B) are in their 0 states, the shift signal then is propagated to the uppermost gates 114 and 116, FIG. 3A.

The signal on line 106 is followed by a signal on line 130. The signal on line 130 is applied to condition each of gates 132 (FIG. 3A) to transfer the contents of the corresponding flip-flop 126 into the corresponding pointer flip-flop 98. This effectively resets the pointer flip-flop which was in its 1 state and causes the pointer flip-flop corresponding to that one of the intermediate flip-flops 126 which was set to its 1 state by the signal on line 106 to itself be set to its 1 state. The pointer-change operation is completed by a signal applied through line 134 to reset all the intermediate flip-flops 126 to their 0 state. It is possible for the pointer to be completely recycled back to its starting word position, if no other matching word can be found.

Just as read or write operation may be controlled by the match indicator flip-flops 55 in a manner previously described, the read and write operations may also be controlled by the pointer flip-flops. In order to accomplish this, the desired read or write input is applied to the appropriate line 74 or 78 at the same time that a signal is applied to access-under-control-of-pointer-flip-flops line 136. The signal on line 136 is applied as one input to AND gates 138 (FIG. 3B), the other input to each of these AND gates being output line 110 from the 1 side of the corresponding pointer flip-flop 98. Since only one of the pointer flip-flops will be in its 1 state at any given time, only one of the AND gates 138 will generate an output signal when a signal is applied to line 136. The signal on output line 140 from that AND gate is applied through the corresponding OR gate 90 to energize the appropriate AND gate 76 or 80 to cause the desired write or read operation to be performed in a manner identical to that previously described for an access under control of match indicator flip-flops 55.

DETAILED DESCRIPTION OF SYSTEM OPERATION

Referring to FIG. 2A, it is seen that the system of this invention is controlled by a clock 198 which has a plurality of timing pulse generators or single-shots individually designated as T0–T37 to correspond with their respective outputs. Each of the single-shots T0–T37 generates a signal on an output line 200–237 respectively when it is set. When the single-shot switches from its set to its reset state (i.e., when the single-shot "times out"), it generates a "not" signal (e.g., $\overline{T4}$). In some instances the only such of these "time-out" lines as are actually used in the system of FIGS. 2A–2E are shown in FIG. 2A, since only certain ones of the "not" output signals are utilized herein. In order to simplify the drawings, no attempt has been made to connect the outputs from clock 198 to the various points in the system where they are utilized. Instead, at each point in the system where a clock line is utilized, a line appears with the number and letter designations for the appropriate clock line.

In most instances, when a single-shot in clock 198 times out, the single-shot following it is set. In some instances, however, a single-shot is set by an output signal from some point in the system. These signals have been shown as inputs to the left side of the clock 198, FIG. 2A. The internal connections of clock 198 are functionally designated in a manner to be described shortly.

The operation of the system shown in FIGS. 2A–2E is initiated when CPU 10 (FIG. 2A) applies the ID and address information for a desired word through lines 22 to register 24 (FIG. 2B) and applies a signal to either line 26 or 28 to properly set alteration flip-flop 30. The alteration flip-flop is set to its 1 state if the word is to be altered. CPU 10 then applies a signal to start line 100, which sets single shot T0. Single-shot T0 being set initiates a cycle of operation of the system.

Referring now to FIG. 1, it is seen that each of the boxes A–N denoting the various steps of the operation contains a designation of the single-shot or single-shots which are set when that step in the operation is being performed. The relationship of the operations being performed under control of each of the single-shots to the overall scheme of operation may thus easily be ascertained. The following chart indicates, for each single-shot in clock 198, its set conditions, the functions performed when the single-shot is set, and the functions performed when the single-shot times out. This information, in conjunction with the interrelationship information provided by the flow chart of FIG. 1, provides a full detailed description of the operation of the system.

| Single shot | Set conditions | Functions performed when set | Functions performed when timing out |
|---|---|---|---|
| T0 | Signal on output line 254 from O R gate 252 (FIG. 2A) (i.e., start signal on line 100 from CPU 10 or timing out of T25 and replace flip-flop 256 (FIG. 2C) in its 0 state resulting in signal on line 258 or timing out of T36 and rewrite and replace flip-flop 260 in its 0 state resulting in signal on line 262). | Reset argument mask 46 (FIG. 2E) (i.e., apply signal through O R gate 264 to line 266). | Set T1. |
| T1 | Timing out of T0 | Gate ID and block fields of register 24 (FIG. 2B) to ID and block fields of argument register 32 (FIG. 2E) (i.e., condition gate 268) Set ID and block fields of argument mask 46 to 1. Reset match indicators 55 (FIG. 3B) to 1 state [i.e., apply signal through O R gate 270 (FIG. 2B) and line 54 to controls 34] Reset end-of-line flip-flop 36 (FIG. 2D) (i.e., apply signal through O R gate 272 to line 274). | Set T2. |
| T2 | Timing out of T1 | Perform associate operation (i.e., apply signal through O R gate 276 to associate line 57). | Set T3. |
| T3 | Timing out of T2 | Interrogate match indicator flip-flops to determine if a match was found during associate operation [i.e., apply signal through O R gate 278 (FIG. 2B) and line 64 to memory controls 34]. | Set T4. |
| T4 | Timing out of T3 | Reset A & R fields of argument register 32 (FIG. 2E) to 0 (i.e., apply signal through O R gate 280 to line 282). Reset argument mask 46 (i.e., apply signal through O R gate 264 to line 266). | Test end-of-line flip-flop 36 (FIG. 2D) (i.e., apply conditioning signal to gate 284) If in 0 state, set T5. If in 1 state, set T16. |
| T5 | Timing out of T4 and end-of-line flip-flop 36 (FIG. 2D) in its 0 state (i.e., signal on output line 286 from 284). | Reset write mask 47 (FIG. 2E) (i.e., apply signal through O R gate 288 to line 290). Read out from associative memory 16 under control of match indicator flip-flops [i.e., apply signal through O R gate 292 (FIG. 2B) to MI control line 82 and through O R gate 294 to read line 78 leading into controls 44]. | Set T6. |
| T6 | Timing out of T5 | Gate core block right hand field of MDR 20 (FIG. 2E) to left-hand field of core memory MAR 44 (Fig. 2C) and gate right-hand field of register 24 (Fig. 2B) to right-hand field of MAR 44 (i.e. apply conditioning signal to gates 296 and 298). Set R field of MDR to 1. Set R field of write mask 47 to 1. | Set T7. |
| T7 | Timing out of T6 | Write into associative memory 16 under control of match indicator flip-flops i.e. apply signal thru O R gate 292 (FIG. 2B) to MI control line 82 and through O R gate 300 to write line 74. Reset A and R fields of argument register 32 (FIG. 2E) (i.e. apply signal through O R gate 280 to line 282). Reset argument mask 46 (i.e. apply signal through O R gate 264 to line 266). | Set T12. |
| T8 | Timing out of T15 or timing out of T12 and alteration flip-flop 30 (FIG. 2A) in its 0 state (i.e., signal on output line 400 from gate 310. | Set R field of argument mask 46 (FIG. 2E) to 1 (i.e. apply signal through O R gate 302 to line 304). Reset match indicator flip-flops i.e. apply signal through O R gate 270 (FIG. 2B) and line 54 to controls 34. Reset end-of-line flip-flop 36 (Fig. 2D) (i.e. apply signal through O R gate 272 to line 274). | Set T9. |
| T9 | Timing out of T8 | Perform an associate operation (i.e. apply signal through O R gate 276 (Fig. 2E) to associate line 57). | Set T10. |
| T10 | Timing out of T9 | Interrogate match indicators to determine if match occurred during associate operation [i.e. apply signal through O R gate 278 (Fig. 2B) to interrogate line 64]. | Set T11. |
| T11 | Timing out of T10 | Not used | Test end-of-line flip-flop 36 (Fig. 2D) (i.e. apply conditioning signal to gate 306). If flip-flop in its 1 state, set T13. If flip-flop in its 0 state, apply signal via line 308, O R gate 316 and line 45 to CPU 10 to signify end of operation. |
| T12 | Timing out of T7 | Reset write mask 47 (FIG. 2E) (i.e., apply signal through O R gate 288 to line 290). | Test alteration flip-flop 30 (FIG. 2A) (i.e. apply signal to condition gate 310). If in 0 state, set T8. If in 1 state set T14. |
| T13 | Timing out of T11 and end-of-line flip-flop 36 (FIG. 2D) in its 1 state (i.e. signal on output line 312 from gate 306). | Reset R field of each word in associative memory 16 to 0. | Apply signal via O R gate 316 and line 45 to CPU 10 (FIG. 2A) to signify end of operation. |
| T14 | Timing out of T12 and alteration flip-flop 39 (FIG. 2A) in its 1 state (i.e. signal on output line 314 from gate 310). | Set a field of MDR 20 (FIG. 2E) to 1. Set A field of write mask 47 to 1. | Set T15. |
| T15 | Timing out of T14 | Perform write operation in associative memory under control of match indicator flip-flops [i.e. apply signal through O R gate 292 (FIG. 2B) to MI control line 82 and apply signal through O R gate 300 to write line 74]. | Set T8. |

| Single shot | Set conditions | Functions performed when set | Functions performed when timing out |
|---|---|---|---|
| T16 | Timing out of T4 and end-of-line flip-flop 36 (FIG. 2D) in its 1 state (i.e. signal on output line 320 from gate 284). | Set A field of argument mask 46 to 1. Set R field of argument mask 46 to 1 (i.e. apply signal through OR gate 302 to line 304). Reset match indicator flip-flops [i.e. apply signal through OR gate 270 (FIG. 2B) and line 54 to associative memory controls 34]. Reset end of line flip-flop 36 (FIG. 2D) (i.e. apply signal through OR gate 272 to line 274). | Set T17. |
| T17 | Timing out of T16 | Perform an associate operation [i.e. apply signal through OR gate 276 (Fig. 2E) to associate line 57]. | Set T18. |
| T18 | Timing out of T17 | Interrogate match indicators to determine if match found during associate operation [i.e. apply signal through OR gate 278 (Fig 2B) to interrogate line 64]. | Set T19. |
| T19 | Timing out of T18 | Not used | Test end of line flip-flop 36 (FIG. 2D) (i.e. apply conditioning signal to gate 322). If flip-flop in its 0 state, set T20. If flip-flop in its 1 state, set T27. |
| T20 | Timing out of T19 and end of line flip-flop 36 (FIG. 2D) in its 0 state (i.e. signal on output line 324 from gate 322). | Initiate a shift pointer operation [i.e. apply signal through OR gate 326 (FIG. 2B) to shift pointer (I) line 106]. | Set T21. |
| T21 | Timing out of T20 | Perform second step of shift pointer operation [i.e. apply signal through OR gate 328 (FIG. 2B) to shift pointer (II) line 130]. | Set T22. |
| T22 | Timing out of T21 | Reset intermediate flip-flops in controls 34 [i.e. apply signal through OR gate 250 (FIG. 2B) to line 134]. Read out of associative memory 16 under control of pointer flip-flops (i.e. apply signal through OR gate 330 (FIG. 2B) to pointer control line 136 and through OR gate 294 to read line 78). | Set T23. |
| T23 | Timing out of T22 | Apply contents of ID and block fields of register 24 (Fig. 2B) to replacement address register (RAR) 40 (FIG. 2C) (i.e., apply signal through OR gate 332 and line 334 to condition gates 336). Gate core block field (right-hand field) of MDR 20 (FIG. 2D) to core address register (CAR) 38 (FIG. 2C) (i.e., apply conditioning signal through OR gate 338 and line 340 to gate 342) Gate contents ID and block fields of register 24 to ID and block fields of MDR 20 (i.e., apply conditioning signal through OR gate 344 and line 346 to gates 348). Set all fields of write mask 47 to 1 (i.e., apply signal through OR gate 350 to line 352) Reset A and R fields of MDR 20 to 0 (i.e., apply signal through OR gate 354 to line 356). Apply replace input to channel 18 (FIG. 2C) and set replace flip-flop 256 to its 1 state. | Set T24. |
| T24 | Timing out of T23 | Write into associative memory 16 under control of pointer flip-flops [i.e. apply signal through OR gate 330 (FIG. 2B) to line 136 and through OR gate 300 to write line 74]. | Set T25. |
| T25 | Timing out of T24 or Timing out of T26 | Not used | Test replace flip-flop 256 (FIG 2C) (i.e. apply conditioning signal to gate 358). If flip-flop in its 0 state, set T0. If flip-flop in its 1 state, set T26. |
| T26 | Timing out of T25 and replace flip-flop 256 (FIG. 2C) in its 1 state (i.e. signal on output line 360 from gate 358). | (Single-shot used for delay only) | Set T25. |
| T27 | Timing out of T19 and end of line flip-flop 36 (FIG. 2D) in its 1 state (i.e. signal on output line 362 from gate 322). | Set A field of argument register 32 (FIG. 2E) to 1. Set match indicator flip-flops to their 1 state [i.e. apply signal through OR gate 270 (FIG. 2B) to line 54]. Reset end-of-line flip-flop 36 (FIG. 2D) (i.e. apply signal through OR gate 272 to line 274). | Set T28. |
| T28 | Timing out of T27 | Perform an associate operation [i.e. apply signal through OR gate 276 (Fig. 2E) to associate line 57]. | Set T29. |
| T29 | Timing out of T28 | Interrogate match indicator flip-flops for matches during associate operation [i.e. apply signal through OR gate 278 (FIG. 2B) to match indicator interrogator line 64]. | Set T30. |
| T30 | Timing out of T29 | Initiate a shift pointer operation [i.e. apply signal through OR gate 326 (FIG. 2B) to shift pointer (I) line 106]. | Set T31. |
| T31 | Timing out of T30 | Continue the shift pointer flip-flop operation (i.e. apply signal through OR gate 328 (FIG. 2B) to shift pointer (II) line 130). | Set T32. |
| T32 | Timing out of T31 | Reset intermediate flip-flops 126 (FIG. 3A) [i.e. apply signal through OR gate 250 (FIG. 2B) to line 134]. Perform read operation on associative memory 16 under control of pointer flip-flop (i.e. apply signal through OR gate 330 (FIG. 2B) to pointer control line 136 and through OR gate 294 to read line 78). | Set T33. |
| T33 | Timing out of T32 | Gate ID and block field of MDR 20 to write address register (WAR) 42 (FIG. 2C) (i.e. condition gate 364). | Set T34. |

| Single shot | Set conditions | Functions performed when set | Functions performed when timing out |
|---|---|---|---|
| T34 | Timing out of T33 | Gate ID and block fields of register 24 (FIG. 2B) into RAR 40 (FIG. 2C) (i.e. apply conditioning signal through OR gate 332 and line 334 to gate 336). Gate core block field (right-hand) field) of MDR 20 into CAR 38 (FIG. 2C) (i.e., apply conditioning signal through OR gate 338 line 340 to gate 342). Gate ID and block fields of register 24 to ID and block fields of MDR 20 (i.e., apply conditioning signal through OR gate 344 and line 346 to gates 348). Set all fields of write mask 47 to 1, (i.e., apply signal through OR gate 350 to line 352). Reset A and R fields of MDR 20 to 0 (i.e., apply signal through OR gate 354 to line 356). Apply signal to rewrite and replace input of channel 18 (FIG. 2C) and set rewrite and replace flip-flop 260 to its 1 state. | Set T35. |
| T35 | Timing out of T34 | Write into associative memory 16 under control of pointer flip-flops [i.e. apply signal through OR gate 330 (FIG. 2B) to pointer control line 136 and apply signal through OR gate 300 to write line 74]. | Set T36. |
| T36 | Timing out of T35 or Timing out of T37 | Not used | Test rewrite and replace flip-flop 260 (FIG. 2C). If flip-flop in its 0 state, set T0. If flip-flop in its 1 state, set set T37. |
| T37 | Timing out of T36 and rewrite and replace flip-flop 60 (FIG. 2C) in its 1 state (i.e., signal on output line 366 from gate 368). | (Single-shot used for delay only) | Set T36. |

Although, in the preferred embodiment of the invention shown in FIGS. 2A–2D, the utilization criterion for replacement selection has been supplemented by both the alteration criterion and the pointer criterion, it is apparent that, where cost is a factor and lower performance may be tolerated, the utilization criterion may be used alone with a random selection being made among blocks which satisfy the utilization criterion. Other possibilities are the utilization criterion in conjunction with the alteration criterion and a random selection among blocks satisfying this criterion or the utilization criterion in conjunction with the pointer criterion.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for determining which member of a finite set of members is to be replaced when a new member is to be added to the set and the set is full comprising:
   associative memory means for indicating the members of the set which have recently been utilized;
   means for selecting for replacement a member of the set which has not recently been utilized;
   means operative, where there is more than one member of the set which has not recently been utilized, for selecting, in accordance with at least one other criterion, which of these members is to be replaced;
   said associative memory mean being operative for indicating the members of the set whose contents have been altered, the absence of the alteration of the contents serving as said other criterion;
   said associative memory means including means for containing set member alteration information, indicators for each of said members respectively, and comparing means for comparing said alteration information with said indicators to determine sair alteration criterion.

2. A memory system comprising:
   a first memory, the entries of which are divided into a large number of blocks;
   a second memory having a limited number of block positions for storing selected blocks of entries from said first memory;
   associative memory means for indicating which blocks are in said second memory;
   means for indicating which blocks in said second memory have been recently utilized;
   means responsive to an attempt to place a new block in said second memory when said second memory is full for placing said new block in said second memory in place of a block in said second memory which has not been recently utilized;
   said associative memory means being operative for indicating whether a block has been altered since being transferred into said second memory;
   said associative memory means including means for containing block alteration information, indicators for each of said blocks respectively, and comparing means for comparing said alteration information with said indicators to determine the alteration criterion;
   and means operable for selecting for replacement, where possible, a block in said second memory which has neither been altered nor recently utilized.

3. A memory system of the type described in claim 2 wherein said selecting means is operative in response to an indication that there are no blocks in said second memory which have neither been altered nor recently utilized for selecting for replacement a block in said second memory which has not been recently utilized;
   and including means for causing the selected block which is to be replaced to be written back into said first memory before the new block is written into its block position in said second memory.

4. A memory system of the type described in claim 2 wherein said selecting means includes:
   means for indicating the last block position in said second memory in which a replacement was made;
   and means operative, when another block stored in said second memory is to be replaced, for selecting for replacement the block stored in the next block position following said indicated block position in said second memory, which complies with the other replacement criteria.

5. A memory system comprising:
   a first memory, the entries of which are divided into a large number of blocks;
   a second memory having block positions for storing a few of the blocks of said first memory;
   an associative memory having an entry for each block position in said second memory, each entry in said associative memory having a field for storing a designation of the block from said first memory which is stored in the associated second memory block position, a one bit alteration field and a one bit utilization field;

means operative when a block in said second memory is utilized for setting the bit of the utilization field of the corresponding associative memory entry;

means operative when the utilization fields of all the entries in said associative memory are set for resetting all the utilization fields;

means operative when a new block from said first memory is to be stored in said second memory and said second memory is full for selecting for replacement a block in said second memory for which the corresponding utilization field in said associative memory is reset;

means operative each time the contents of a block in said second memory is altered for setting the alteration field of the corresponding associative memory entry;

and means included as part of said selecting means for selecting for replacement, where possible, an entry in said second memory for which both the alteration and the utilization fields of the corresponding entry in said associative memory are reset.

6. A memory system of the type described in claim 5 wherein said selecting means is operative in response to an indication that there are no entries in said associative memory for which both the alteration and the utilization fields are reset for selecting for replacement a block in said second memory for which the corresponding utilization field is reset;

and including means for causing the altered block which is to be replaced to be written back into said first memory before the new block is written into its block position in said second memory.

7. A memory system comprising:

a first memory, the entries of which are divided into a large number of blocks;

a second memory having block positions for storing a few of the blocks of said first memory;

an associative memory having an entry for each block position in said second memory, each entry in said associative memory having a field for storing a designation of the block from said first memory which is stored in the associated second memory block position, and a one bit utilization field;

means operative when a block in said second memory is utilized for setting the bit of the utilization field of the corresponding associative memory entry;

means operative when the utilization fields of all the entries in said associative memory are set for resetting all the utilization fields;

means operative when a new block from said first memory is to be stored in said second memory and said second memory is full for selecting for replacement a block in said second memory for which the corresponding utilization field in said associative memory is reset;

pointer means for indicating the entry in said associative memory which corresponds to the last block position in said second memory in which a replacement was made;

and means, included as part of said selecting means, for causing the next block replacement to be made on the block at the position corresponding to the next entry in said associative memory, following the indicated entry, for which the other replacement criteria are fulfilled.

8. In a data processing system of the one-level-store type, a method for determining which member of a set of information blocks stored in a limited-capacity working memory is to be replaced when said memory is filled to its capacity and a new block is to be entered therein, said method utilizing replaceability criteria indicators associated with the respective block addresses in the working memory and comprising the steps of:

setting an indicator respectively associated with any selected one of the block addresses in the working memory to a "referenced" indicating state whenever a block at that address is referenced by said system, thereby affording one criterion for determining the replaceability of such a block;

causing an automatic reset of all such reference indicators to their "unreferenced" indicating state whenever all of said indicators concurrently register a "referenced" indicating state;

setting another indicator respectively associated with any selected one of the block addresses in the working memory to a state indicative of a second replaceability criterion whenever a block at that address assumes a condition to which such a criterion applies;

and automatically selecting one of the blocks in said working memory for replacement according to the respective settings of the replaceability criteria indicators for the various block addresses in said memory.

9. A method according to claim 8 in which the setting of any of said other indicators to its second criterion indicating state occurs only if the associated block is altered when it is referenced, said method further including the step of preventing an altered block from being replaced so long as said memory contains at least one other block whose respective criteria indicators show that it has an unreferenced and unaltered status.

References Cited

UNITED STATES PATENTS

| | | |
|---|---|---|
| 2,843,841 | 7/1958 | King et al. |
| 3,231,868 | 1/1966 | Bloom et al. |
| 3,248,702 | 4/1966 | Kilburn et al. |
| 3,248,708 | 4/1966 | Haynes. |
| 3,251,041 | 5/1966 | Chu. |
| 3,275,991 | 9/1966 | Schneberger. |
| 3,284,776 | 11/1966 | Freedman. |
| 3,292,152 | 12/1966 | Barton. |
| 3,351,909 | 11/1967 | Hummel. |

PAUL J. HENON, Primary Examiner